(12) United States Patent
Dehoumon (10) Patent No.: US 10,581,871 B1
(45) Date of Patent: Mar. 3, 2020

(54) CONTROLLED-ENVIRONMENT FACILITY RESIDENT COMMUNICATIONS EMPLOYING CROSS-ORIGIN RESOURCE SHARING

(71) Applicant: Securus Technologies, Inc., Carrollton, TX (US)

(72) Inventor: Nikita Dehoumon, Montreal (CA)

(73) Assignee: Securus Technologies, Inc., Carrollton, TX (US)

( * ) Notice: Subject to any disclaimer, the term of this patent is extended or adjusted under 35 U.S.C. 154(b) by 219 days.

(21) Appl. No.: 15/587,339

(22) Filed: May 4, 2017

(51) Int. Cl.
*H04L 29/06* (2006.01)
*H04L 29/08* (2006.01)
(Continued)

(52) U.S. Cl.
CPC ......... *H04L 63/107* (2013.01); *G06Q 50/265* (2013.01); *H04L 12/4625* (2013.01);
(Continued)

(58) Field of Classification Search
None
See application file for complete search history.

(56) References Cited

U.S. PATENT DOCUMENTS 9,027,115 B2 * 5/2015 Larson ............... H04L 29/12066
726/14
9,300,687 B2 * 3/2016 Johns ...................... H04L 63/10
(Continued)

OTHER PUBLICATIONS

Hsu, Yen-Chun et al. MicroApp: Architecting Web Application for Non-Uniform Trustworthiness in Cloud Computing Environment. 2014 IEEE Eighth International Conference on Software Security and Reliability-Companion. https://ieeexplore.ieee.org/stamp/stamp.jsp?tp=&arnumber=6901646 (Year: 2014).*
(Continued)

*Primary Examiner* — Jeremiah L Avery
(74) *Attorney, Agent, or Firm* — Fogarty LLP (57) ABSTRACT

Controlled-environment facility resident electronic communications for controlled-environment facility resident communications and/or data devices disposed within a controlled-environment facility may employ a controlled-environment facility communications processing system, or the like. The controlled-environment facility communications processing system, may be configured to host controlled-environment facility communications access services and accept a Cross-Origin Request Sharing (CORS) request from a non-resident device. These CORS requests may be for access to the controlled-environment facility communications access services for use by a controlled-environment facility communications Application Program Interface (API) running on the non-resident device to communicate with one of the controlled-environment facility resident devices. The controlled-environment facility communications processing system, or the like, may make access to the controlled-environment facility communications access services available, such as, in a CORS response. Thereby, communication between the controlled-environment facility communications API running on the non-resident device and the target controlled-environment facility resident device may be provided.

28 Claims, 4 Drawing Sheets

(51) Int. Cl.
H04L 12/46 (2006.01)
H04L 12/24 (2006.01)
G06Q 50/26 (2012.01)

(52) U.S. Cl.
CPC ...... H04L 41/0806 (2013.01); H04L 65/1069 (2013.01); H04L 67/02 (2013.01); H04L 67/18 (2013.01); H04L 67/34 (2013.01)

(56) References Cited

U.S. PATENT DOCUMENTS

| | | | | |
|---|---|---|---|---|
| 9,332,090 | B1* | 5/2016 | Fallows | H04L 67/02 |
| 9,369,467 | B1* | 6/2016 | Rohee | H04L 63/10 |
| 9,843,576 | B1* | 12/2017 | Peng | H04L 63/083 |
| 9,860,119 | B2 | 1/2018 | De Magalhaes | H04L 67/02 |
| 10,050,939 | B2* | 8/2018 | Hristov | G06F 9/45558 |
| 10,389,701 | B2* | 8/2019 | Le Scouarnec | H04L 67/02 |
| 10,419,541 | B2* | 9/2019 | Harrison | H04L 63/029 |
| 2007/0288247 | A1* | 12/2007 | Mackay | G06Q 10/00 |
| | | | | 705/1.1 |
| 2009/0089078 | A1* | 4/2009 | Bursey | H04W 4/70 |
| | | | | 705/300 |
| 2010/0281107 | A1* | 11/2010 | Fallows | G06F 9/54 |
| | | | | 709/203 |
| 2012/0039262 | A1* | 2/2012 | Walsh | H04L 45/04 |
| | | | | 370/329 |
| 2014/0258383 | A1* | 9/2014 | Milne | H04L 67/10 |
| | | | | 709/203 |
| 2014/0280995 | A1* | 9/2014 | Ezell | H04L 65/1016 |
| | | | | 709/229 |
| 2015/0143223 | A1* | 5/2015 | Kolam | G06F 17/2247 |
| | | | | 715/234 |
| 2015/0143464 | A1* | 5/2015 | Vallee | H04L 41/12 |
| | | | | 726/3 |
| 2016/0337384 | A1* | 11/2016 | Jansson | G06F 17/30876 |
| 2017/0243014 | A1* | 8/2017 | Gopalakrishnan | G06F 21/606 |

OTHER PUBLICATIONS

Carlson, Darren et al. Ambient Web: Bridging the Web's Cyber-physical Gap. 2012 3rd IEEE International Conference on the Internet of Things. https://ieeexplore.ieee.org/stamp/stamp.jsp?tp=&arnumber=6402297 (Year: 2012).*

* cited by examiner

CONTROLLED-ENVIRONMENT FACILITY RESIDENT COMMUNICATIONS EMPLOYING CROSS-ORIGIN RESOURCE SHARING

TECHNICAL FIELD

This specification is related to communications by and with residents of controlled-environment facilities, and specifically to controlled-environment facility resident electronic communications such as video visitation, Voice over Internet Protocol (VoIP) communications, or the like, employing Cross-Origin Resource Sharing (CORS).

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provided to residents of controlled-environment facilities (such as correctional facilities) include allowing residents (inmates) to place outbound phone calls to non-residents of the controlled-environment facility. More recently, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

SUMMARY

The present invention is directed to systems and methods which provide controlled-environment facility resident electronic communications for controlled-environment facility resident communications and/or data devices disposed within a controlled-environment facility and/or non-resident communications and/or media devices disposed outside the controlled-environment facility, employing Cross-Origin Resource Sharing (CORS). These electronic communications may include controlled-environment facility video visitation sessions, Voice over Internet Protocol (VoIP) communications, and/or the like. Therein, a controlled-environment facility communications processing system, and/or the like, may be configured to host controlled-environment facility communications access services and accept a CORS request from a non-resident communications and/or media device. These CORS requests may be for access to the controlled-environment facility communications services for use by a controlled-environment facility communications Application Program Interface (API) running on the non-resident device to communicate with one of the controlled-environment facility resident devices. The request may include credentials from the non-resident, the controlled-environment facility communications application program interface, the bridge, the browser, the non-resident device and/or the like, and/or the CORS request may be a CORS preflight request.

In some implementations, a controlled-environment facility communications processing system provided bridge running on the non-resident device may be configured to interact with a World Wide Web Consortium (W3C) specification compliant browser on the non-resident device. Therein, the controlled-environment facility communications API running on the non-resident device, requests, via the bridge, using the CORS request, access to the controlled-environment facility communications services. Hence, in some such implementations the controlled-environment facility communications processing system, and/or the like, may provide the non-resident a link to download the controlled-environment facility communications API and bridge to the non-resident device. This download may also include an installer program, an uninstall program etcetera, configured to install and uninstall the controlled-environment facility communications API and bridge on the non-resident device, etcetera.

In any event, the controlled-environment facility communications processing system, and/or the like, may make access to the controlled-environment facility communications services available, such as, in a CORS response. Thereby, communication between the controlled-environment facility communications API running on the non-resident device and the target controlled-environment facility resident device may be provided.

In some implementations, another bridge, configured to interact with a W3C specification compliant browser, may be installed on the resident devices. Therein, a controlled-environment facility communications API running on the resident device may request, via the bridge, using a CORS request, access to the controlled-environment facility communications.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods are generally related to communications by and with residents of controlled-environment facilities, and specifically to controlled-environment facility resident electronic communications such as video visitation, Voice over Internet Protocol (VoIP) communications, or the like, employing Cross-Origin Resource Sharing (CORS). In accordance with embodiments of the present systems and methods, controlled-environment facility resident electronic communications for controlled-environment facility resident communications and/or data devices disposed within a controlled-environment facility, and/or non-resident media devices disposed outside the controlled-environment facility, may employ a controlled-environment facility communications processing system, and/or the like. The controlled-environment facility communications processing system may be configured to host controlled-environment facility communications access services and accept a CORS request from a non-resident device. These CORS requests may be for access to the controlled-environment facility communications services for use by a controlled-environment facility communications Application Program Interface (API) running on the non-resident device. The controlled-environment facility communications processing system, and/or the like, may make access to the controlled-environment facility communications services available, such as, in a CORS response. In this manner, communication between the controlled-environment facility communications API running on the non-resident device and the target controlled-environment facility resident device may be provided.

As internet browsers have migrated from the use of NPAPI (Netscape Plugin Application Programming Interface) and plugins (such as JAVA® plugins), JAVA®, or the like, issues arise with offering controlled-environment facility resident video visitation, voice over IP (VoIP), services and/or the like with residents of controlled-environment facilities to non-residents. For example, browsers that do not support JAVA® cannot employ JavaScript Object Notation with Padding, or the like for cross-domain access to resources.

CORS enables cross API sharing, such as by allowing cross-domain communication from an internet browser. Typically, CORS, is used by internet browsers in compliance with World Wide Web Consortium (W3C) specifications to show information, which may include data, images, or the like. For example, in a retail setting, CORS may be used to show an image of a product and the pricing for the product offered on a site different from the site currently being viewed by the internet browser's user. This allows the server of the site being viewed to avoid maintaining the pricing information itself. CORS is not typically used by a local service running on the browsing device. However, CORS may, in accordance with embodiments of the present systems and methods allow a local computer, or the like, running a controlled-environment facility communications API to enable server hosted features.

In accordance with embodiments of the present systems and methods, a bridge may be provided for non-resident communications and/or media devices to use CORS, particularly for internet browsers that comply with W3C specifications. This bridge may, in conjunction with the browser, provide a runtime environment employing CORS. That is, CORS may be employed, in accordance with embodiments of the present systems and methods to request a service whereby video communication, VoIP communication, or another client API running on a local device may carry out controlled-environment facility resident communications, or the like. While specifications implementing CORS call for an internet browser employing CORS to allow any service to run on that internet browser, the bridge may also run in the background, thereby enabling the local API to invoke the relevant communications services, via the internet browser, without a need for a plug-in or the like. Thus, the user does not need to install a plug-in or otherwise burden their internet browser or device.

In furtherance of the above, a download package may be provided to the non-resident user that includes the API, bridge, an installer, an uninstaller, an updater, and/or a process manager and/or the like. For example, a non-resident may access a controlled-environment facility visitation site, which may prompt the non-resident to download an executable software package that includes a controlled-environment facility communications API, bridge, installer, uninstaller, updater and/or process manager. The non-resident runs the executable to invoke the installer to install the controlled-environment facility communications API, bridge, updater and/or process manager. The controlled-environment facility communications API may run automatically after the installation of the executable software package or when the non-resident user logs in to a controlled-environment facility communications website, onto the non-resident device itself, or when the non-resident user invokes the controlled-environment facility communications API. The updater may ensure the installed bridge, process manager and controlled-environment facility communications API are up-to-date. In accordance with embodiments of the present systems and methods, the process manager is responsible for launching, controlling and running of the updater.

Figure 1:
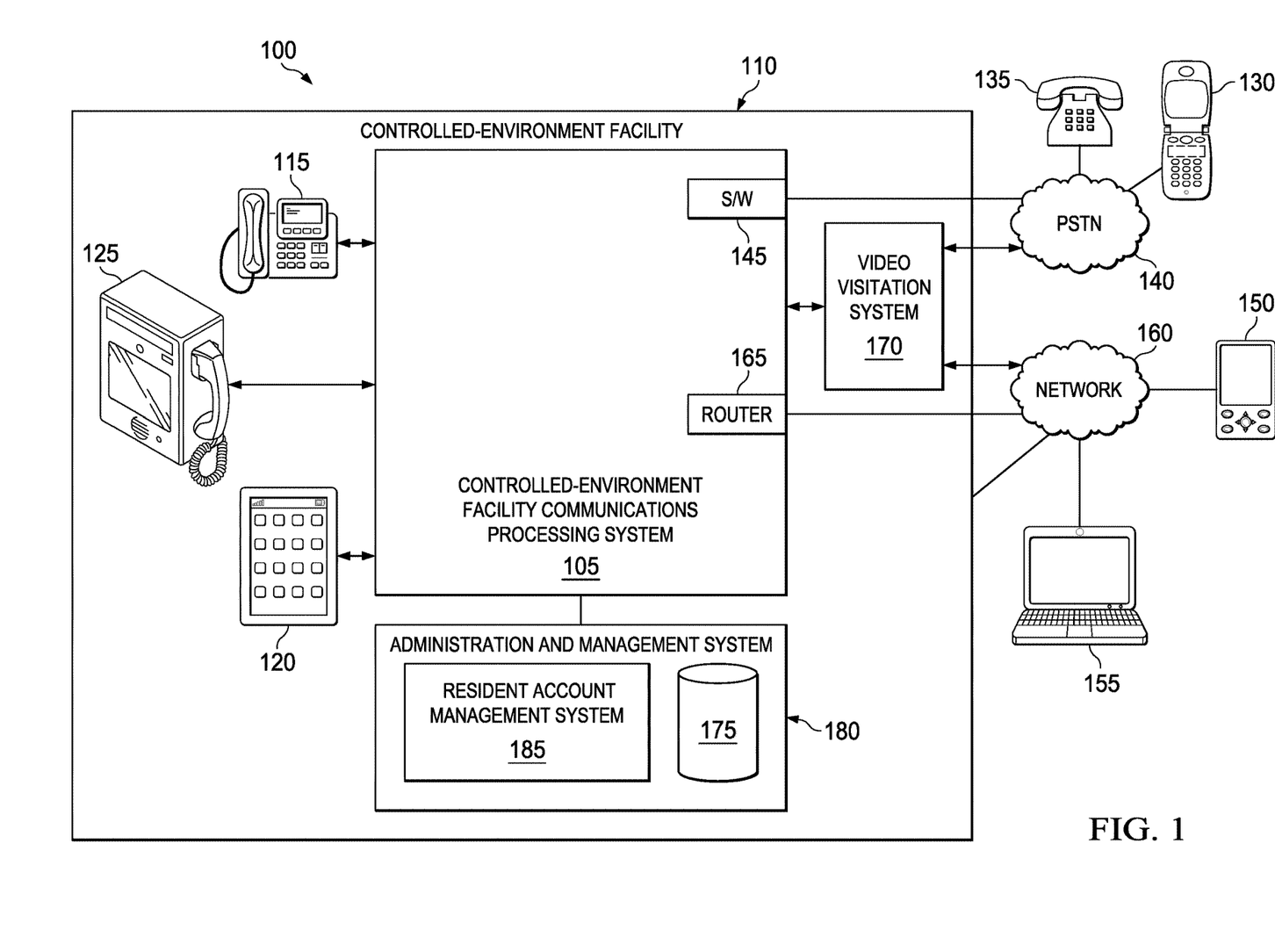
FIG. 1 is a diagrammatic illustration of an example communications environment, wherein an example embodiment of the present systems and methods for controlled-environment facility resident communications employing Cross-Origin Resource Sharing (CORS) may be deployed.

FIG. 1 is a diagrammatic illustration of example communications environment 100, wherein an example embodiment of the present systems and methods for controlled-environment facility resident communications employing CORS may be deployed.

As shown, controlled-environment facility communications processing system 105 may provide telephone services, videoconferencing, online chat, and other communication services to controlled-environment facility 110. In some cases, as illustrated, communications processing system 105 may be co-located with controlled-environment facility 110. Alternatively, communications processing system 105 may be centrally or remotely located with respect to one or more controlled-environment facilities and/or may provide communication services to multiple controlled-environment facilities. More generally, however, it should be noted that communications processing system 105 may assume a variety of forms, and may be configured to serve a variety of facilities and/or users, whether within or outside of a controlled-environment facility.

Residents may use more-or-less conventional telephones 115 to access certain communication services. In some facilities, residents may also use a personal computer wireless device, such as a tablet computing device (120) or smartphone, which may have been adapted and/or approved for use in controlled-environment facility. Such a device may be referred to as an Intelligent Inmate Device (IID), or the like, in a correctional institution embodiment. Also in some facilities, a resident may use a video communication device 125, or the like, to place voice calls, as well as for video communication. Such a video communication device may be referred to as an Intelligent Facility Device (IFD), which may be a video phone particularly adapted for use in a controlled-environment facility. Generally speaking, video communication device/IFD 125 may be disposed in a visitation room, in a pod, as part of a kiosk, etc. As will be appreciated, IID 120, IFD 125, or other similar devices have video conferencing capabilities, or the like, to enable a party to participate in video communication sessions with other call parties, such as non-residents of the controlled-environment facility, via video communication, secure online chat, etc.

As noted, IID 120 may be a tablet computing device, smartphone, or the like, adapted and/or approved for use by residents of the controlled-environment facility (within the controlled-environment facility). Each IID 120 may be particularly adapted for use in a controlled-environment. For example, in a correctional institution, jail, or the like, such an IID may be "stripped-down," particularly from the standpoint of what applications programs (apps) are provided or allowed on IID 120, and/or connectivity afforded IID 120. For example, such an IID may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility for example limiting the availability of a Wi-Fi signal providing the stream through the placement of wireless access points, antenna directionality of such wireless access points, and/or the like. Also, the IID may have a few fixed apps pre-installed on the device, and installation of further apps on the device may be forbidden (i.e. prevented by modifications to the device's operating system, or the like) and/or restricted, such as by requiring permission from a facility administrator, or the like. For example, embodiments of the present systems and methods may be used in lieu of, or rather than a locally installed app, which may have significant overhead for a mobile device, due to security features which may be required for communication with a controlled-environment facility resident, particularly a correctional facility inmate. Further apps provided on IID 120 might include apps of particular interest to residents of the controlled-environment facility. For example, IID 120 provided to inmates of correctional facilities, might include apps that may be of particular use to an inmate, in general, such as access to a legal research service, or of more specific interest, such as providing an inmate nearing release, access to employment searching apps or the like. Hence, such IIDs may be used to help soon to be released inmates transition. For example, the IID may be used to communicate with a future employer, or the like. As such, IIDs may be sponsored, or otherwise subsidized by organizations or companies, assisting with the transition of inmates into society.

In some embodiments, video communication devices (IFDs) 125 may be implemented as a computer-based system. For example, each of video communication devices 125 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video communication session, video communication devices 125 may be configured to capture a video image of a resident to be transmitted to a non-resident using the camera, and to display a video image of the non-resident to the resident using the display. Video communication devices 120 may also be configured to capture an audio signal from the resident to be transmitted to a non-resident using the mouthpiece portion of the handset, and to provide an audio signal from the non-resident to the resident using the earpiece portion of the handset. Additionally or alternatively, audio received from the non-resident may be reproduced via a loudspeaker, and audio provided by the resident may be captured via a microphone. In some cases, video communication devices 125 may assume the form of any computer, tablet computer, smart phone, etc., or any other consumer device or appliance with videoconferencing capabilities. For example, in a correctional facility environment a tablet computing device may be mounted on a wall, in a hardened case as a video communication device.

To access communications services, a resident may initiate telephone services by lifting the receiver on telephone 115 or IFD 125, and/or otherwise initiating a call, such as by launching an applications program (app) on IID 120. At which time, the resident may be prompted to provide a personal identification number (PIN), other identifying information or biometrics. An interactive voice response (IVR) unit (not shown, but which may be integrated into controlled-environment facility communications processing system 105) may generate and play a prompt, or other messages, to the resident on device 115, 120 or 125. Under the control of communications processing system 105, devices 115, 120 and 125 may be capable of connecting to a non-resident's (i.e., a person not incarcerated or otherwise committed to a controlled-environment facility) device 130 or telephone 135 across a publicly switched telephone network (PSTN) 140. For example, device 130 may be a mobile phone, whereas telephone 135 may be located at a non-resident's home or office, at a resident visitation center, etc. Switch 145 in controlled-environment facility communications processing system 105 may be used to connect calls across PSTN 140. Additionally or alternatively, the non-resident may communicate using devices 150 or 155, which may be connected through an Integrated Services Digital Network (ISDN), Voice-over-IP (VoIP), or packet data network 160, such as, for example the Internet. Router 165 of communications processing system 105 is used to route data packets associated with a call connection to devices 150 or 155. For example, a non-resident party may have a personal or laptop computer 155 with a webcam, or the like, or device 150 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards.

Video visitation system 170 may be configured to provide, schedule, and manage communication services to residents and non-residents of a controlled-environment facility. Although video visitation system 170 is shown in FIG. 1 as being located within controlled-environment facility 110 and separate from communications processing system 105, video visitation system 170 may be located outside facility 110 and/or integrated within communications processing system 105. Video visitation system 170 and/or communications processing system 105 receive and/or manage video visitation signals via network 160. Video visitation system 170 may be coupled to PSTN 140 and/or network 160 in a manner similar to communications processing system 105 by also including one or more gateways, switches and/or routers (not shown). Accordingly, video visitation system 170 may be configured to communicate with one or more residents of the controlled-environment facility via devices 115, 120 or 125 and with one or more non-residents via devices 130, 135, 150 or 155. To this end, video visitation system 170 may include one or more media gateways, multimedia servers, and/or the like, which may facilitate not only video communications but also conversion of a voice communication to a video communication, and the like. For example, video visitation system 170 may setup and tear down voice calls, video communication, and the like, such as under direction of a media gateway controller, which may be separate from or integrated with video visitation system 170 and/or its media gateway(s), multimedia server(s), etc.

In addition to facilitating certain visitation and communication operations, communications processing system 105 may attempt to ensure that a resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 175 maintained by controlled-environment Administration and Management System (AMS) 180. In addition to PAC list(s), AMS 180 may also store Resident Profile Data (RPD), as well as communication and/or visitation rules applicable to each resident. As an example, in the context of a correctional facility, AMS 180 is referred to as a Jail Management System (JMS). Within the AMS or JMS 180, database 175 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 185, which may be a separate system, or which may be a part or function of AMS 180, as illustrated, may maintain resident accounts to the benefit of the respective resident, such as a resident communications accounts, which may be used to pay for communications, such as phone calls, video visitation, internet chats, emails, text messages, or the like. Such communications accounts may in some embodiments, include community communications accounts maintained by controlled-environment facility resident account management system 185, administration and management system 180, and/or the like, of at least one controlled-environment facility, to the benefit of a number of residents of the same of different facilities for payment of communications.

In some implementations, communications processing system 105 may be configured to perform video communication monitoring operations configured to monitor and or record video communication sessions (e.g., as electronic video files). In scenarios where communications processing system 105 is located within the controlled-environment facility, it may have direct access to AMS or JMS 180. In other embodiments, however, communications processing system 105 may be located remotely with respect to the controlled-environment facility, and access to AMS or JMS 180 may be obtained via a computer network such as, for example, network 160.

In accordance with embodiments of the present systems and methods, controlled-environment facility communications processing system 105 may (in conjunction with video visitation system 170, linked resident communications devices 115, 120, 125, and/or the like) embody or include a controlled-environment facility electronic communications system, which hosts controlled-environment facility communications access services. Such communications access services may provide, or otherwise facilitate, controlled-environment facility resident access to voice communications (including VoIP communications), video (such as video visitation sessions) or other electronic communications. Further, the controlled-environment facility electronic communications system also accepts a CORS request to access the controlled-environment facility communications services for use by a controlled-environment facility communications API. Thereby, the API may facilitate communication with a controlled-environment facility resident on a controlled-environment facility resident communications and/or data device 115, 120, 125, or the like. For example, the controlled-environment facility electronic communications system may be configured to accept a CORS request from non-resident communications and/or media device 150, 155, or the like, to access the controlled-environment facility communications services for use by a controlled-environment facility communications API running on the non-resident device to communicate with a controlled-environment facility resident device (115, 120 or 125). The request may include credentials from the non-resident, the controlled-environment facility communications API, the bridge, the browser, the non-resident communications and/or media device, and/or the like. Such credentials may include digital signatures, cryptographic keys, security tokens, passwords, PINs etc. The CORS request may, at least initially, be a CORS "preflight" request, a request to determine whether the API has permission to proceed with the request and/or access the controlled-environment facility electronic communications system hosted services. Upon receipt of the request, and any necessary processing of accompanying credentials, the controlled-environment facility electronic communications system responds, via a CORS response, making access to the controlled-environment facility communications services available to provide communication between the controlled-environment facility communications API running on the non-resident device 150, 155, or the like, and the controlled-environment facility resident device (115, 120 or 125).

To facilitate such above-described communications with controlled-environment facility residents, controlled-environment facility communications processing system 105 (and/or video visitation system 170) may provide a bridge to run on non-resident device 150, 155, or the like. To this end the bridge may be further configured to interact with a W3C specification compliant browser. In accordance with embodiments of the present systems and methods, the controlled-environment facility communications API running on the non-resident device (150 or 155), requests, via the bridge, using the above-discussed CORS request, access to the controlled-environment facility communications services to communicate with the controlled-environment facility resident communications and/or data device (115, 120 or 125).

To this end, in accordance with embodiments of the present systems and methods, the controlled-environment facility communications API or bridge installed and running on the non-resident device (150 or 155) may allow cross domain access for the controlled-environment facility electronic communications system for domain names associated with a website accessed by the browser if the domain is among a configurable set of domain names. For example, the controlled-environment facility communications API or bridge installed in the non-resident devices (150 or 155) may only allow cross domain access to the resident device in an event the domain of the visited website belongs to, or is otherwise associated with, the controlled-environment facility electronic communications system (105), a facility communications provider, or the like. In the event the domain name associated with the website visited via the non-resident's browser is not among such a configurable set of domain names, the controlled-environment facility communications API or bridge installed on the non-resident device (150 or 155) does not allow cross domain access. Further, if the domain name associated with the website visited via the non-resident's browser is not among such a configured set of domain names, the API may trigger an alert to the non-resident user, create an event log, transmit the event log to communication processing system 105, etc.

The controlled-environment facility resident electronic communications system (controlled-environment facility communications processing system 105 and/or video visitation system 170) may provide the non-resident a link to follow on their device (150 or 155) to download the controlled-environment facility communications API and bridge to their device, for installation. To this end, the download may be an executable package that includes an installer program configured to install the controlled-environment facility communications API and bridge on the non-resident device, an uninstaller program configured to uninstall the controlled-environment facility communications API and bridge, an updater to keep the bridge and/or API up to date and a process manager to launch, control and run the updater. Through use of such an updater, a latest version of the communications API/application can be presented for use each time, incorporating the most recent features, including security features, and the like. Having such updated security features may be of particular importance in communications involving controlled-environment facility residents and particularly in communications with correctional facility inmates or the like, in accordance with embodiments of the present systems and methods. For example, such security features can be updated and compliance therewith can be maintained at the server level. In furtherance of this goal the download package may, as noted include the updater, in addition to the installer, uninstaller, process manager and the bridge.

The controlled-environment facility communications API may run automatically after the installation of the executable software package or when the non-resident user logs in to a controlled-environment facility communications website, onto the non-resident device itself, or when the non-resident user invokes the controlled-environment facility communications API. As noted, the process manager is responsible to check whether the updater is running and relaunches the updater in an event the updater crashes. The process manager may run as a tray icon program and the updater and/or process manager may ensure the bridge, etcetera, is up to date. Regardless, in accordance with various embodiments of the present systems and methods, the bridge, whether updated or not, will employ the latest version of the communications API/application available and may invoke an update of itself if the latest version of the communications API/application is not compatible with the bridge, prior to continuing with a requested communication.

In accordance with embodiments of the present systems and methods, processor-based controlled-environment facility resident devices 120, 125, or the like, may also employ a bridge configured to interact with a W3C specification compliant browser, or the like installed on the controlled-environment facility resident device. In accordance therewith, a controlled-environment facility communications API running on controlled-environment facility resident devices 120, 125, or the like, may be configured to request, via the bridge, using a CORS request, access to the controlled-environment facility communications services for use by the resident device controlled-environment facility communications API to communicate with the non-resident, via non-resident communications and/or media device 150, 155, or the like.

Similar to the link provided to the non-resident, the controlled-environment facility resident electronic communications system may provide a controlled-environment facility resident a link to follow on their personal device (120) to download the controlled-environment facility communications API and bridge to the device, for installation. To this end, the download may be an executable package that includes an installer program configured to install the controlled-environment facility communications API and bridge on the resident device (120), an uninstaller program configured to uninstall the controlled-environment facility communications API and bridge, an updater to keep the bridge and/or API up to date and a process manager to launch, control and run the updater. As above, through use of such an updater, a latest version of the communications API/application can be presented for use each time, incorporating the most recent features, including security features, and the like. Having such updated security features may be of particular importance in the present systems and methods, in that the communications involve controlled-environment facility residents and may be particularly important for communications by correctional facility inmates or the like. For example, such security features can be updated and compliance therewith can be maintained at the server level. In furtherance of this goal, the download package may, as noted include the updater, in addition to the installer, uninstaller, process manager and the bridge.

The controlled-environment facility communications API may run automatically after the installation of the executable software package on the resident device or when the resident user logs in to a controlled-environment facility communications website, onto the resident device itself, or when the resident invokes the controlled-environment facility communications API. As noted, the process manager is responsible to check whether the updater is running and relaunches the updater in an event the updater crashes. The process manager may run as a tray icon program and the updater and/or process manager may ensure the bridge, etcetera, is up to date. Regardless, in accordance with various embodiments of the present systems and methods, the bridge, whether updated or not, will employ the latest version of the communications API/application available and may invoke an update of itself if the latest version of the communications API/application is not compatible with the bridge, prior to continuing with a requested communication.

However, a resident device practicing the present systems and methods may have further functionalities, for example, due to security rules associated with the respective facility. For example, the API may only run when a log in is from a resident-user associated with the particular device. In such embodiments, the login may have been, or is, checked via biometric verification, a PIN, password, etc., as discussed above at the time the API is accessed in accordance with the present systems and methods. Further in this regard, installation and/or update of software in a resident device, as described above, may employ further security measures as per security rules associated with the respective facility through the use of such login verification, PIN, password, biometric verification, etc.

In these embodiments, the controlled-environment facility communications API or bridge installed in resident devices 120, 125, or like allows cross domain access to the non-resident device (150 or 155) only if the domain name associated with a website accessed by the browser has a domain among a configurable set of domain names. For example, the controlled-environment facility communications API or bridge installed in resident devices 120, 125 or like allows cross domain access to the non-resident device in an event the domain of the visited website belongs to controlled-environment facility communications processing system 105, or the like. In the event the domain name associated with the web site visited via the resident device browser is not among a configured set of domain names, the API can trigger an alert to the non-resident user, create an event log, transmit the event log to communication processing system 105, etc.

Moreover, the non-resident and resident API, or related software such as the process manager, may maintain a list of non-compliant websites with respect to business rules, security policies, laws and regulations associated with the facility and its service providers. Whenever a website visited by the resident and/or non-resident browser is sending an API request, and the visited website is non-compliant with respect to the business rules, security policies, laws and regulations associated with the facility and/or its service providers, the website visited may be added to the list of non-compliant websites. Such a list of non-compliant websites may be transmitted to the controlled-environment facility communications processing system 105, or the like, at regular intervals.

Figure 2:
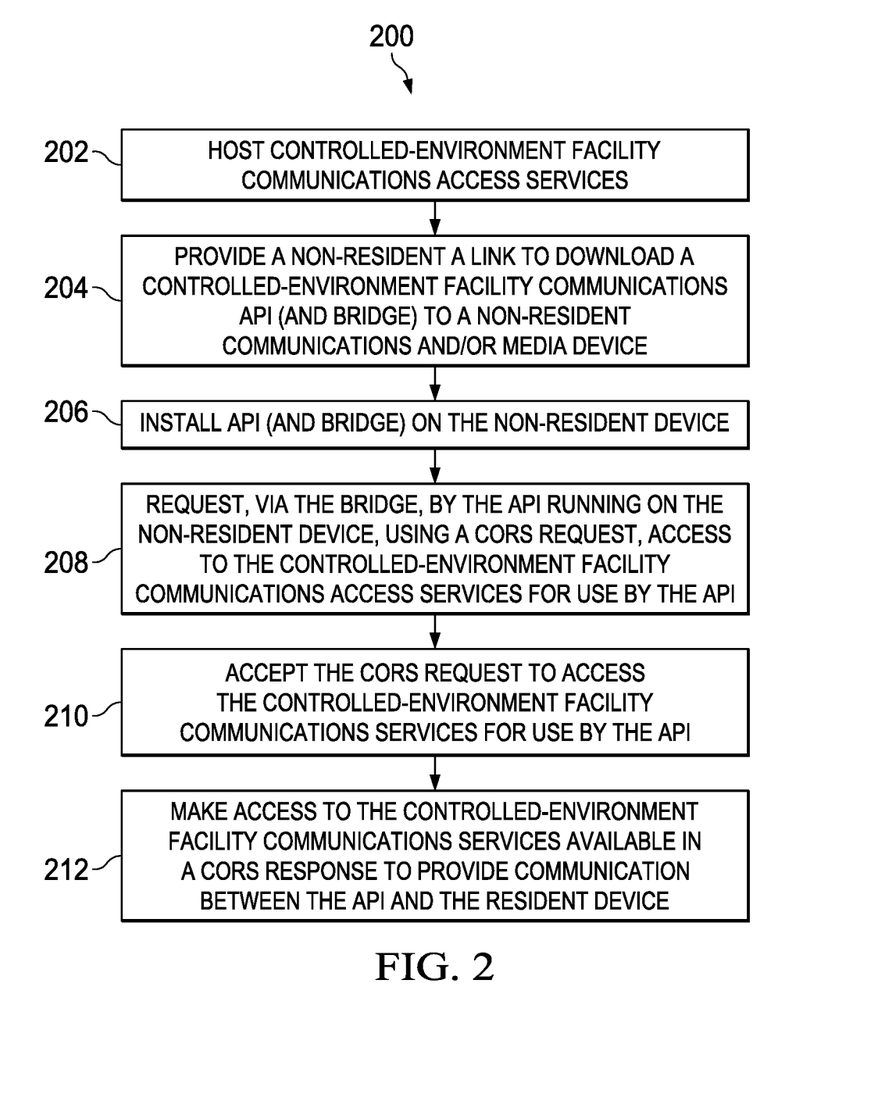
FIG. 2 is a flowchart of an example process for controlled-environment facility resident communications employing CORS, in accordance with some embodiments.

FIG. 2 is a flowchart of example process 200 for controlled-environment facility resident communications employing CORS, in accordance with some embodiments. Process embodiment 200 for providing controlled-environment facility resident electronic communications may include hosting at 202, such as by a controlled-environment facility electronic communications system (e.g. controlled-environment facility communications processing system 105 and/or video visitation system 170), controlled-environment facility communications access services. As noted above, such communications access services may provide, or otherwise facilitate, access to voice communications (including Voice over Internet Protocol (VoIP) communications), video (such as video visitation sessions) or other electronic communications, by controlled-environment facility residents.

In accordance with various embodiments of the present systems and methods, a bridge, which a W3C specification compliant browser can interact with, may be deployed or otherwise provided on the non-resident communications and/or media device (150 or 155). For example, in the illustrated embodiment, a link may be provided to the non-resident to download, or otherwise transfer (upload/download/copy), the controlled-environment facility communications API and bridge to the non-resident communications and/or media device at 204. Whereupon the controlled-environment facility communications API and bridge may be installed on the non-resident communications and/or media device at 206, such as by employing an installer program included with the download/upload/copy. The download/upload/copy may also include an updater and/or process manager, which are installed at the same time as the API and bridge, and may be employed to ensure that the API and bridge remain up to date and secure, as discussed above.

In response to a non-resident initiating a call (on device 150 or 155) to a controlled-environment facility resident, a request may be made at 208. The request may be made, via the bridge, by the controlled-environment facility communications API running on the non-resident communications and/or media device (150 or 155), using a CORS request. The request may be for access to the controlled-environment facility communications services for use by the controlled-environment facility communications API running on the non-resident device to communicate with the controlled-environment facility resident communications and/or data device (115, 120 or 125). Consistent with the above discussion, the CORS request made at 208 may, at least initially, be a CORS preflight request.

At 210, the controlled-environment facility electronic communications system, or the like, may accept the CORS request from a non-resident communications and/or media device (150 or 155) to access the controlled-environment facility communications services for use by a controlled-environment facility communications API running on the non-resident device to communicate with a controlled-environment facility resident device (115, 120 or 125). Consistent with the above, such a request may include credentials from the non-resident, controlled-environment facility communications API, bridge, browser, non-resident communications and/or media device, etc.

Access to the controlled-environment facility communications services may be made available in a CORS response, by the controlled-environment facility electronic communications system, at 212, so as to facilitate communication between the controlled-environment facility communications API running on the non-resident communications and/or media device (150 or 155) and the controlled-environment facility resident device (120 or 125).

Figure 3:
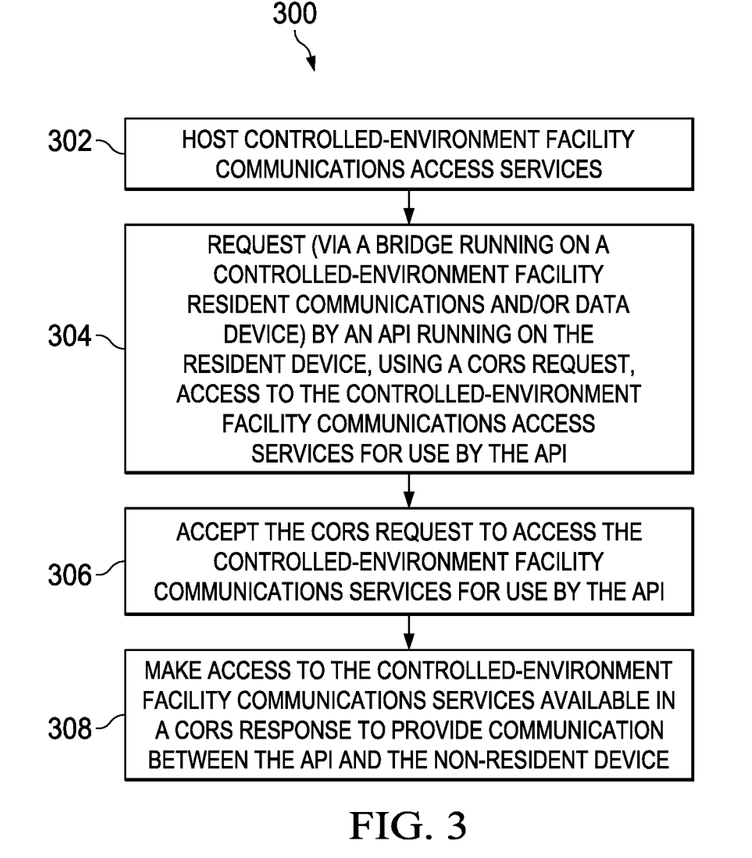
FIG. 3 is a flowchart of another example process for controlled-environment facility resident communications employing CORS, in accordance with some embodiments.

FIG. 3 is a flowchart of example process 300 for controlled-environment facility resident communications employing CORS, in accordance with some embodiments. Also, in accordance with various embodiments of the present systems and methods, such as in process implementation 300 illustrated in FIG. 3, the controlled-environment facility resident communications and/or data device (120 or 125) may additionally, or alternatively, include a bridge as well, configured to interact with a W3C specification compliant browser installed on the controlled-environment facility resident device. In accordance with such embodiments, may also include hosting, such as on a controlled-environment facility electronic communications system (e.g. controlled-environment facility communications processing system 105 and/or video visitation system 170), controlled-environment facility communications access services, at 302. Again, such communications access services may provide, or otherwise facilitate, access to voice communications (including Voice over Internet Protocol (VoIP) communications), video (such as video visitation sessions) or other electronic communications, by controlled-environment facility residents.

As noted, a bridge, which a W3C specification compliant browser can interact with, may be deployed or otherwise provided on a controlled-environment facility resident communications and/or media device (120, 125, or the like). The bridge, API and other related software may be preloaded on a controlled-environment facility resident communications and/or media device (120, 125, etc.), or with non-resident device implementations, such as discussed above with respect the flowchart of FIG. 2, a link may be provided to the resident to download, or otherwise transfer (upload/download/copy), the controlled-environment facility communications API and bridge to the resident's personal communications and/or media device (120). Whereupon, the controlled-environment facility communications API and bridge may be installed on the resident communications and/or media device, such as by employing an installer program included with the download/upload/copy. The download/upload/copy may also include an updater and/or process manager, which are installed at the same time as the API and bridge, and may be employed to ensure that the API and bridge remain up to date and secure, as further discussed above.

At 304, such as in response to a resident initiating a call (on device 120 or 125), a controlled-environment facility communications API running on the controlled-environment facility resident device, may request, via the bridge running on the resident device (120 or 125), using a CORS request, access to the controlled-environment facility communications services. The request may be for use of the services by the resident device controlled-environment facility communications API to communicate with a non-resident communications and/or media device (150, 155, or the like). Again, as noted, the CORS request made at 304 may, at least initially, be a CORS preflight request.

At 306, the controlled-environment facility communications processing system (105), or the like, may accept the CORS request from the resident communications and/or media device (120 or 125) to access the controlled-environment facility communications services for use by a controlled-environment facility communications API running on the resident device to communicate with a non-resident device (150 or 155). Consistent with the above, such a request may include credentials from the resident, controlled-environment facility communications API, bridge, browser, resident communications and/or media device, etc. Also, consistent with the above, such credentials may include digital signatures, cryptographic keys, security tokens, passwords, PINs etc.

Access to the controlled-environment facility communications services may be made available in a CORS response, by the controlled-environment facility electronic communications system, at 308, so as to facilitate communication between the controlled-environment facility communications API running on the resident communications and/or media device (120 or 125) and the non-resident device (150 or 155).

In accordance with the above, the present systems and methods provide a mechanism to facilitate controlled-environment facility communications in the absence of a non-resident device browser supporting JAVA®, or other similar mechanisms. Thereby embodiments of the present systems and methods improve the field of controlled-environment facility resident communications, as well as operation of controlled-environment facility communications processing system, through the use of CORS. Embodiments of the present systems and methods employ CORS in manner that is unconventional and not well-understood, routine or conventional in the field of communications management, processing, or the like.

Figure 4:
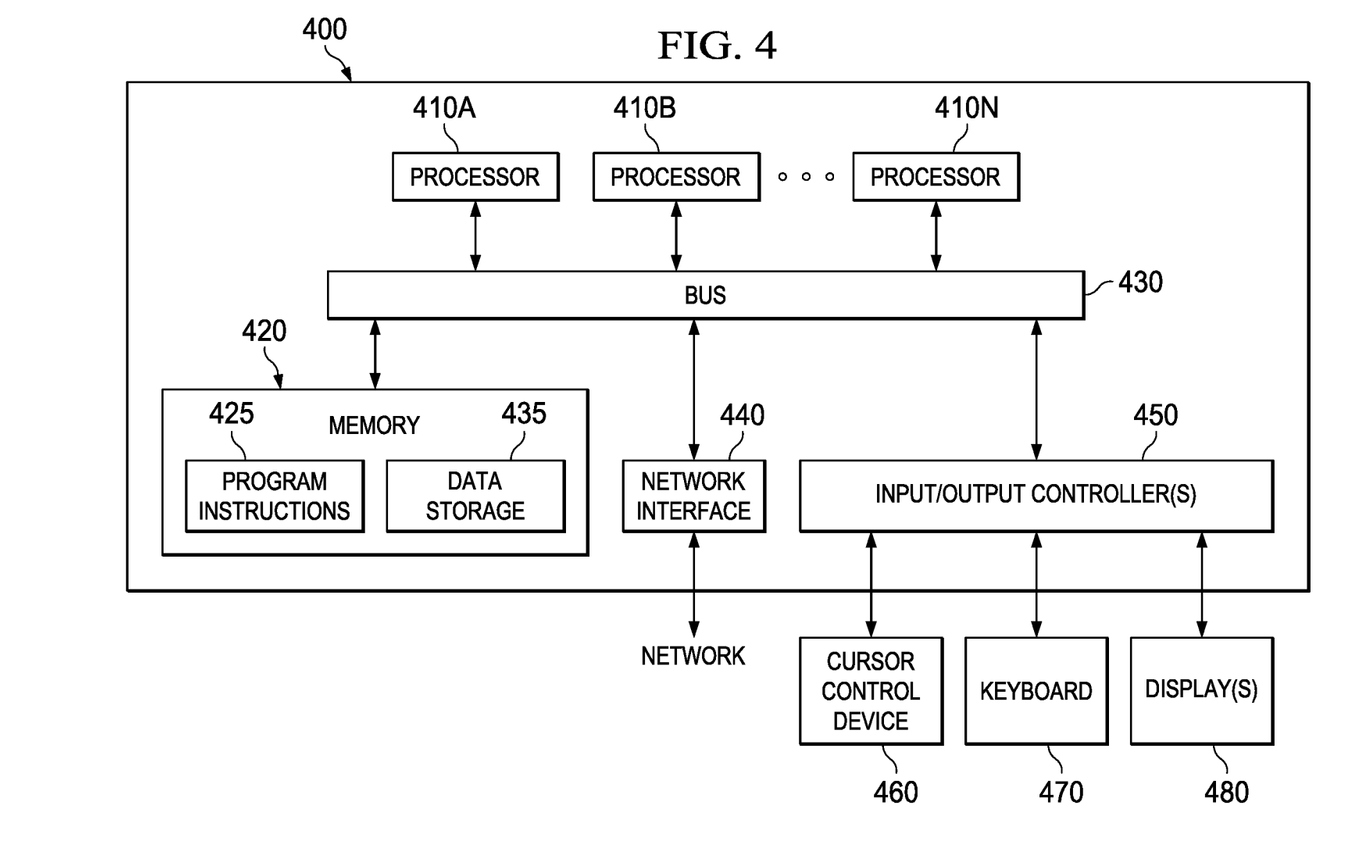
FIG. 4 is a block diagram of a computer system, device, station, or terminal configured to implement various techniques disclosed herein, according to some embodiments.

Embodiments of the present systems and methods for controlled-environment facility resident communications employing cross-origin resource sharing, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example processes 200 and/or 300 described above with respect to FIGS. 2 and 3 and/or a computer system such as computer system 400 may be used as, or as part of, one or more of controlled environment facility communications processing system 105, AMS 180, communications devices 120, 125, 150 and/or 155, video visitation system 170, or the like. In various embodiments two or more of these computer systems may be configured to communicate with each other in any suitable way, such as, for example, via a wired and/or wireless network.

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etc. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 5, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to computer system 400 via I/O interface 430, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C #, JAVA®, JAVASCRIPT®, PERL®, etc.). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident electronic communications system comprising:
    at least one controlled-environment facility resident communications and/or data device disposed within a controlled-environment facility; and
    a controlled-environment facility communications processing system configured to:
        host controlled-environment facility communications access services;
        accept a cross-origin resource sharing request from a non-resident communications and/or media device to access the controlled-environment facility communications access services by a controlled-environment facility communications application program interface running on the non-resident communications and/or media device; and
        make access to the controlled-environment facility communications access services available in a cross-origin resource sharing response to provide electronic communication between the controlled-environment facility communications application program interface running on the non-resident communications and/or media device and one of the at least one controlled-environment facility resident communications and/or data devices.

2. The controlled-environment facility resident electronic communications system of claim 1, further comprising a controlled-environment facility communications processing system provided bridge running on the non-resident communications and/or media device configured to interact with a World Wide Web Consortium (W3C) specification compliant browser, and wherein the controlled-environment facility communications application program interface running on the non-resident communications and/or media device, requests, via the bridge, using the cross-origin resource sharing request, access to the controlled-environment facility communications access services.

3. The controlled-environment facility resident electronic communications system of claim 2, wherein the controlled-environment facility communications processing system is further configured to provide the non-resident communications and/or media device a link to download the controlled-environment facility communications application program interface and bridge.

4. The controlled-environment facility resident electronic communications system of claim 3, wherein the download further comprises an installer program configured to install the controlled-environment facility communications application program interface and bridge on the non-resident communications and/or media device and an uninstall program configured to uninstall the controlled-environment facility communications application program interface and bridge from the non-resident communications and/or media device.

5. The controlled-environment facility resident electronic communications system of claim 2, wherein the request includes credentials from a user of the non-resident communications and/or media device, the controlled-environment facility communications application program interface, the bridge, the browser, and/or the non-resident communications and/or media device.

6. The controlled-environment facility resident electronic communications system of claim 2, wherein at least one of the controlled-environment facility resident communications and/or data devices further comprises:
    another bridge configured to interact with a W3C specification compliant browser installed on the at least one controlled-environment facility resident communications and/or data devices; and
    another controlled-environment facility communications application program interface running on the at least one controlled-environment facility resident communications and/or data devices and configured to request, via the other bridge, using a further cross-origin resource sharing request, access to the controlled-environment facility communications access to communicate with the non-resident communications and/or media device.

7. The controlled-environment facility resident electronic communications system of claim 6, wherein the controlled-environment facility communications processing system is further configured to provide the at least one controlled-environment facility resident communications and/or data device a link to download the controlled-environment facility communications application program interface and bridge.

8. The controlled-environment facility resident electronic communications system of claim 7, wherein the download further comprises an installer program configured to install the controlled-environment facility communications application program interface and bridge on the at least one controlled-environment facility resident communications and/or data device and an uninstall program configured to uninstall the controlled-environment facility communications application program interface and bridge from the at least one controlled-environment facility resident communications and/or data device.

9. The controlled-environment facility resident electronic communications system of claim 1, wherein the cross-origin resource sharing request is a cross-origin resource sharing preflight request.

10. The controlled-environment facility resident electronic communications system of claim 1, wherein the electronic communication comprises a controlled-environment facility video visitation session.

11. The controlled-environment facility resident electronic communications system of claim 1, wherein the electronic communication comprises a voice over internet protocol communication.

12. A method for providing controlled-environment facility resident electronic communications comprising:
   hosting, on a controlled-environment facility communications processing system, controlled-environment facility communications access services;
   accepting, at the controlled-environment facility communications processing system, a cross-origin resource sharing request from a non-resident communications and/or media device to access the controlled-environment facility communications access services by a controlled-environment facility communications application program interface running on the non-resident communications and/or media device; and
   making access to the controlled-environment facility communications access services available in a cross-origin resource sharing response, by the controlled-environment facility communications processing system, to provide electronic communication between the controlled-environment facility communications application program interface running on the non-resident communications and/or media device and a controlled-environment facility resident communications and/or data device disposed within the controlled-environment facility.

13. The method of claim 12, further comprising:
   providing, on the non-resident communications and/or media device, a bridge which a World Wide Web Consortium (W3C) specification compliant browser can interact with; and
   requesting, via the bridge, by the controlled-environment facility communications application program interface running on the non-resident communications and/or media device, using the cross-origin resource sharing request, access to the controlled-environment facility communications access services.

14. The method of claim 13, further comprising providing the non-resident communications and/or media device a link to download the controlled-environment facility communications application program interface and bridge to the non-resident communications and/or media device.

15. The method of claim 14, further comprising installing the controlled-environment facility communications application program interface and bridge on the non-resident communications and/or media device employing an installer program included with the download.

16. The method of claim 13, wherein the request includes credentials from a user of the non-resident communications and/or media device, controlled-environment facility communications application program interface, bridge, browser, and/or non-resident communications and/or media device.

17. The method of claim 13, further comprising:
   providing, on the controlled-environment facility resident communications and/or data device another bridge configured to interact with a W3C specification compliant browser installed on the controlled-environment facility resident communications and/or data device; and
   requesting, via the other bridge, by another controlled-environment facility communications application program interface running on the controlled-environment facility resident communications and/or data device, using a further cross-origin resource sharing request, access to the controlled-environment facility communications access services to communicate with the non-resident communications and/or media device.

18. The method of claim 17, further comprising providing controlled-environment facility resident communications and/or data device a link to download the controlled-environment facility communications application program interface and bridge to controlled-environment facility resident communications and/or data device.

19. The method of claim 18, further comprising installing the controlled-environment facility communications application program interface and bridge on the controlled-environment facility resident communications and/or data device employing an installer program included with the download.

20. The method of claim 12, wherein the cross-origin resource sharing request is a cross-origin resource sharing preflight request.

21. The method of claim 12, wherein the electronic communication comprises a controlled-environment facility video visitation session.

22. The method of claim 12, wherein the electronic communication comprises a voice over internet protocol communication.

23. A tangible non-transitory computer-readable storage medium having program instructions stored thereon that, upon execution by a controlled-environment facility communications processing system, cause the controlled-environment facility communications processing system to:
   host controlled-environment facility communications access services;
   accept a cross-origin resource sharing request to access the controlled-environment facility communications access services by a controlled-environment facility communications application program interface; and
   make access to the controlled-environment facility communications access services available in a cross-origin resource sharing response to provide communication between the controlled-environment facility communications application program interface and a controlled-environment facility resident communications and/or data device disposed within the controlled-environment facility.

24. The tangible non-transitory computer-readable storage medium of claim 23, having program instructions stored thereon that, upon execution by the controlled-environment facility communications processing system, cause the controlled-environment facility communications processing system to provide a non-resident communications and/or media device a link to download the controlled-environment facility communications application program interface and bridge.

25. The tangible non-transitory computer-readable storage medium of claim 24, wherein the download comprises an installer program configured to install the controlled-environment facility communications application program interface and bridge on the non-resident communications and/or media device and an uninstall program configured to uninstall the controlled-environment facility communications application program interface and bridge from the non-resident communications and/or media device.

26. The tangible non-transitory computer-readable storage medium of claim 23, having program instructions stored thereon that, upon execution by the controlled-environment facility communications processing system, cause the controlled-environment facility communications processing system to make access to the controlled-environment facility communications access services available in a cross-origin resource sharing response to provide communication between the controlled-environment facility communications application program interface and a non-resident communications and/or media device.

27. The tangible non-transitory computer-readable storage medium of claim 26, having program instructions stored thereon that, upon execution by the controlled-environment facility communications processing system, cause the controlled-environment facility communications processing system to provide a controlled-environment facility resident communications and/or data device a link to download the controlled-environment facility communications application program interface and bridge.

28. The tangible non-transitory computer-readable storage medium of claim 27, wherein the download comprises an installer program configured to install the controlled-environment facility communications application program interface and bridge on the controlled-environment facility resident communications and/or data device and an uninstall program configured to uninstall the controlled-environment facility communications application program interface and bridge from the controlled-environment facility resident communications and/or data device.

\* \* \* \* \*